Patented Aug. 13, 1968

3,397,037
DIGESTION OF TITANIUM-BEARING ORES
George Leathwhite Roberts, Jr., Lynchburg, Horace Andrew Bragg, Arrington, and Walter Roye Whately, Lynchburg, Va., assignors to American Cyanamid Company, Stamford, Conn., a corporation of Maine
No Drawing. Filed July 8, 1965, Ser. No. 470,584
10 Claims. (Cl. 23—117)

ABSTRACT OF THE DISCLOSURE

In a process for producing titanium dioxide pigments, a titanium-bearing ore is digested with a strong mineral acid in the presence of a surface active agent to produce a digestion cake. The digestion cake is then leached with either water or a dilute mineral acid. The use of a surface active agent decreases the time necessary to effect satisfactory leaching. The surface active agent can be premixed with the acid prior to mixing with the ore, or the acid and the surface active agent can be added simultaneously to the ore as separate streams.

---

This invention broadly relates to improvements in the preparation of titanium dioxide pigments, and more particularly relates to an improved process whereby in the digestion of titanium-bearing ores the cake obtained has improved processing characteristics and gives improved yields of high quality pigments.

It is an object of the invention to provide a process for recovery of titanium compounds from titanium-bearing ores. It is another object of the invention to provide a method for producing an improved cake after acid digestion of titanium ores.

Another object of the invention is to provide a process for digestion of ores using selected surfactants for producing a digestion cake with improved dissolution properties.

Another object is to obtain titanium bearing solids from ores and slags which produce titanium dioxides in improved yields and of high quality.

Still further objects will become apparent from the description and embodiments presented hereinafter.

It has been known in the art to digest titanium bearing ores in strong acid and thereafter recover the titanium containing compounds from the resulting digestion cake. In general, the ores used are ilmenite, arizonite and the like including titanium bearing slags.

The comminuted titanium bearing ores or slags are generally first digested with a strong mineral acid such as sulfuric or hydrochloric, whereby the titanium compounds are rendered soluble, after which the titanium dioxide is recovered.

One widely used process for recovery of titanium compounds from ores and slags and ultimate manufacture of titanium pigments therefrom comprises the preparation of titanium sulfate solutions by reaction of the finely ground titanium ores with concentrated (80–95%) sulfuric acid. The digested ore can then be leached by treating with dilute acid to give acidic solutions containing the titanium values as well as soluble compounds of iron and other metallic impurities. The solution may then be treated in well known manner to separate iron and the other impurities after which the purified solution is hydrolyzed to give hydrous titanium dioxide.

It has been known and disclosed in the prior art to include certain materials such as glycerides of saturated fatty acids for the purpose of overcoming or decreasing substantially the tendency of any previously added flotation agents to cause foaming. These materials do not function, however, as surfactants for the purpose of the present invention.

There has now been discovered an unexpected improvement in the titanium recovery process whereby one or more selected surfactants are added, in relatively small amounts to the sulfuric acid after which the ore is digested with the acid-surfactant mixture to give an improved cake of better porosity which can be more readily dissolved. The cake is then put into solution in water or weak acid. The resulting solution containing the titanium salts dissolved therein, is then purified in any desired and appropriate manner. Such purification steps are well known in the art. Finally, the titanium compounds are recovered either by hydrolysis or other suitable well known means of precipitation from the purified solution.

A number of advantages are realized by practice of the invention. The final digestion cake obtained is found to be more porous and dissolves more readily in a shorter period of solution time. There is also a somewhat higher percentage recovery of the titanium as the purified dioxide.

Typical of the surfactants which have been found effective in this improved process are the non-ionic and modified non-ionic surfactants such as those marketed by the name of Zonyl A which is a modified aliphatic ethylene oxide condensate, the polyoxyethylene coco methyl ammonium chloride known commercially as Ethoquad C/12, long chain phenol polyethylene oxide condensation products such as the Igepal 610 series, the polyethylene glycols such as the commercial product known as Carbowax 550, and the dialkylesters of sodium sulfosuccinic acid, such as the commercial product known as Aerosol OT.

In general, the types of surfactants which can be used include non-ionic, cationic, and anionic types, and preferably the surfactants for optimum use are the non-ionic and cationic which are more stable in the presence of strong acid. Preferred for use are polyoxyethylene alkyl quaternary ammonium salts, and the long chain aryl polyethylene oxide condensation products.

It is contemplated to use the surfactants in amounts up to about ten percent based on the amount of titanium bearing ore which is being treated. The preferred range is from 0.1 to about 1 percent of surfactant.

It is preferred for best results to add the surfactant to the acid before it is contacted with the ore although they can be mixed simultaneously.

The titanium bearing ores should be ground or pulverized until substantially all the material is below 325 mesh, to provide for more rapid reaction with the sulfuric or hydrochloric acid.

The acids which can be used include those well known for the digestion of titanium bearing ores and slags. It is preferred to use concentrated sulfuric acid of at least 80%. The digestion mixture of ore and acid is also preferably heated so that reaction to form the sulfates takes place more rapidly and completely. Although not absolutely necessary, it is helpful to bake the cake for some time to insure more complete reaction. The cake is then dissolved in water or weak acid and the titanium dioxide recovered therefrom.

EXAMPLE 1

A mixture of 2.5 parts by weight of Ethoquad (a polyoxyethylene coco methyl ammonium chloride) and 1615 parts by weight of 93% sulfuric acid was heated to 50° C. To this heated mixture was added 1000 parts by weight of finely ground ilmenite with agitation. This acid and ore mixture was then further heated to 75° C. at which temperature 130 parts by weight of water at 25° C. was added to the mixture. The approximate final sulfuric acid strength was 86%. This mixture was then further heated with agitation to approximately 180° C. at which point an exothermic reaction took place. After the reaction, which usually continues from a few minutes to a considerable period of time depending on variables in the system, including acid strength and type of ore, the resulting cake was then placed in an oven and held at 160–170° C. temperature for three hours. After its removal from the oven, the cake was allowed to cool for 30 to 60 minutes to an approximate cake temperature of 40 to 60° C.

Three thousand parts of 0.3% sulfuric acid solution at 50° C. temperature was then added to the cake and agitation introduced. Thereafter every ten minutes for a period of three hours a specific gravity determination was taken to determine the rate of solution. Every thirty minutes a sample was taken to determine the soluble titanium content. During the solution period the temperature was maintained at 50 to 60° C.

After three hours solution, the percent recovery was obtained from the total and soluble titanium content of the solution, calculated as titanium dioxide.

A second experiment was carried out as described in Example 1 above except that 0.25% Zonyl-A (a modified nonionic surfactant) was used in place of the Ethoquad. A control experiment was carried out as described above in Example 1 except that no surfactant was added to the sulfuric acid. Table 1 shown below summarizes the results obtained in Example 1 using Ethoquad and in Example 2 using Zonyl-A as well as the control experiment.

The foregoing examples are presented only for purpose of illustrating the invention and it is intended in no way to restrict the invention thereto.

We claim:
1. In a process for the recovery of titanium compounds from titanium bearing materials which comprises digesting titanium bearing materials in a concentrated mineral acid to convert substantially the titanium compounds to water soluble titanium compounds in cake form, mixing said cake with an aqueous medium to dissolve said soluble titanium compounds and recovering said dissolved titanium compounds by precipitation, the improvement which comprises digesting said titanium bearing materials with concentrated mineral acid in the presence of an acid-stable surfactant selected from the group consisting of a polyoxyethylene alkyl quaternary ammonium salt, a long chain aryl polyethylene oxide condensation product, a dialkyl ester of sulfosuccinic acid and a modified aliphatic ethylene oxide condensate.

2. The process of claim 1 wherein the surfactant is a modified aliphatic ethylene oxide condensate.

3. The process of claim 1 wherein the mineral acid is a sulfuric acid solution.

4. In a process as defined in claim 1, the improvement

TABLE 1

| Sample No. | 1 | | 2 | | 3 | |
|---|---|---|---|---|---|---|
| Surfactant | None | | Zonyl-A | | Ethoquad C/12 | |
| Percent Surfactant, Ore Basis | Control | | (Non-ionic) 0.25 | | (Cationic) 0.25 | |
| | Sp. Gr. | Sol. TiO₂, g./l. | Sp. Gr. | Sol. TiO₂, g./l. | Sp. Tr. | Sol. TiO₂, g./l. |
| Time, min.: | | | | | | |
| 10 | 1.140 | | 1.420 | | 1.120 | |
| 20 | 1.220 | | 1.450 | | 1.420 | |
| 30 | 1.300 | 81 | 1.460 | 124 | 1.460 | 122 |
| 40 | 1.360 | | 1.470 | | 1.470 | |
| 50 | 1.410 | | 1.475 | | 1.474 | |
| 60 | 1.430 | 101 | 1.480 | 128 | 1.476 | 128 |
| 70 | 1.430 | | 1.480 | | 1.480 | |
| 80 | 1.432 | | 1.480 | | 1.480 | |
| 90 | 1.460 | 121 | 1.480 | 136 | 1.482 | 128 |
| 100 | 1.475 | | 1.480 | | 1.484 | |
| 110 | 1.500 | | 1.580 | | 1.484 | |
| 120 | 1.500 | 138 | 1.480 | 138 | 1.486 | 138 |
| 130 | 1.510 | | 1.485 | | 1.488 | |
| 140 | 1.520 | | 1.485 | | 1.494 | |
| 150 | 1.525 | 138 | 1.485 | 140 | 1.458 | 139 |
| 160 | 1.530 | | 1.485 | | 1.504 | |
| 170 | 1.530 | | 1.485 | | 1.508 | |
| 180 | 1.535 | 138 | 1.490 | 151 | 1.510 | 153 |

NOTE.—Percent recovery = Sol. TiO₂/Total TiO₂.

EXAMPLE 3

Example 1 was repeated twice more, in one case using 0.10 part by weight of Aerosol OT and in the second instance using 0.05 part by weight of Aerosol OT instead of the specified amount of Ethoquad as the surfactant. Aerosol OT is a commercial name for the anionic surfactant, which is the dioctylester of sodium sulfosuccinic acid.

Table 2 below shows the results obtained using the 0.5% Aerosol OT and 0.10% Aerosol OT as compared with a control experiment using no surfactant. The comparative data show a faster rate of solution of the titanium bearing digestion cake when the surfactant is employed.

wherein the surfactant is a polyoxyethylene alkyl quaternary ammonium salt.

5. In a process as defined in claim 1, the improvement wherein the surfactant is a long chain aryl polyethylene oxide condensation product.

6. In a process as defined in claim 1, the improvement wherein the surfactant is a dialkyl ester of sulfosuccinic acid.

7. The process of claim 1 in which the surfactant is used in amounts of not more than ten weight percent based on the weight of ore.

8. The process of claim 1 wherein the titanium bearing material is ilmenite.

TABLE 2

| Sample No. | 4 | | 5 | | 6 | |
|---|---|---|---|---|---|---|
| Surfactant | 0.05% Aerosol OT | | 0.10% Aerosol OT | | None (Control) | |
| | Sp. Gr. | Sol. TiO₂, g./l. | Sp. Gr. | Sol. TiO₂, g./l. | Sp. Gr. | Sol. TiO₂, g./l. |
| Times, min.: | | | | | | |
| 30 | 1.360 | 91 | 1.430 | 110 | 1.335 | 80 |
| 60 | 1.470 | 118 | 1.450 | 119 | 1.460 | 99 |
| 90 | 1.490 | 128 | 1.454 | 128 | 1.480 | 119 |
| 120 | 1.496 | 136 | 1.456 | 132 | 1.505 | 123 |
| 150 | 1.506 | 142 | 1.464 | 137 | 1.515 | 129 |
| 180 | 1.520 | 143 | 1.492 | 137 | 1.532 | 132 |

9. The process of claim 1 wherein the titanium bearing material is a slag.

10. The process of claim 1 wherein the titanium bearing material is arizonite.

References Cited
UNITED STATES PATENTS

| | | | |
|---|---|---|---|
| 1,891,911 | 12/1932 | Brode et al. | 23—117 X |
| 2,066,093 | 12/1936 | Cauwenberg | 23—117 |
| 2,724,637 | 11/1955 | Stanley | 23—117 |
| 2,731,327 | 1/1956 | Anderson et al. | 23—202 |
| 2,804,375 | 8/1957 | Kamlet | 23—202 |
| 2,822,241 | 2/1958 | Griffin et al. | 23—117 |
| 2,982,613 | 5/1961 | Griffin | 23—117 |
| 3,076,692 | 2/1963 | Ruter et al. | 23—202 |

OTHER REFERENCES

H. Bennett's "Concise Chemical and Technical Dictionary," 1962 edition, page 891, Chemical Pub. Co., inc.

OSCAR R. VERTIZ, *Primary Examiner.*

E. STERN, *Assistant Examiner.*